3,102,774
TREATMENT OF WOOL WITH EPOXIDES IN THE PRESENCE OF DIMETHYLFORMAMIDE
Nathan H. Koenig, Berkeley, Calif., assignor to the United States of America as represented by the Secretary of Agriculture
No Drawing. Filed Oct. 5, 1961, Ser. No. 143,255
7 Claims. (Cl. 8—128)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes is hereby granted to the Government of the United States of America.

This invention relates broadly to the chemical modification of wool by reacting it with an epoxide, that is, an organic compound containing the characteristic epoxy group

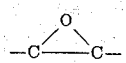

In particular, the invention concerns and has as its prime object the provision of processes wherein the reaction of wool with organic epoxides is conducted in the presence of N,N-dimethylformamide, hereafter referred to as dimethylformamide. Further objects and advantages of the invention will be apparent from the following description wherein parts and percentages are by weight, unless otherwise specified.

In accordance with the present invention, wool is reacted with an epoxide in the presence of dimethylformamide. The latter compound catalyzes the actual chemical combination of the wool and the epoxide reactant. As a consequence, one is enabled to readily prepare wools containing substantial proportions of combined epoxide with correspondingly improved properties.

The unusual and effective action of dimethylformamide as a catalyst for the reaction of epoxides with wool is demonstrated by the follow comparative tests:

(a) Dry wool flannel (1.2 g.) and glycerol-1,3-diglycidyl ether (6 ml.) were heated for 60 minutes at 105° C. The wool was then extracted with acetone and ethanol to remove unreacted reagents and dried. It was found that the increase in weight of the wool was only 3%.

(b) Dry wool flannel (1.2 g.) was heated with glycerol-1,3-diglycidyl ether (3 ml.) and dimethylformamide (3 ml.) for 60 minutes at 105° C. The wool was extracted as described above and dried. In this case, the increase in weight of the wool, due to reaction with the epoxide, was 23%.

The fact that dimethylformamide acts as a catalyst rather than a mere solvent is demonstrated by the following experimental data:

Dry wool flannel (1.2 g.), glycerol-1,3-diglycidyl ether (3 ml.) and dimethylforamide (3 ml.) were heated for 90 minutes at 105° C. The wool was extracted with acetone and ethanol to remove unreacted reagents and dried. It was found that the increase in weight of the wool, due to reaction with the epoxide, was 25%. A series of experiments were then carried out under the same conditions but substituting for the dimethylformamide the same volume of the following solvents: butyl acetate, chlorobenzene, and xylene. In these runs, the increase in weight of the wool was only 3 to 4%.

Carrying out the process of the invention essentially involves contacting wool with an epoxide in the presence of dimethylformamide under essentially anhydrous conditions. The reaction conditions such as proportion of reagents, specific epoxide used, time, temperature, etc., are not critical but may be varied to suit individual circumstances without changing the basic nature of the invention. The proportion of dimethylformamide may be varied widely and may be as low as 0.1 volume per volume of epoxide. In the case of epoxides which are normally solid, the volume considered is that of the molten (liquefied) compound. Usually, it is preferred to use a larger proportion of dimethylformamide, i.e., about 0.2 to 5 volumes thereof per volume of epoxide to attain an increased reaction-promoting effect. The temperature of reaction may be about from 25° to 135° C. The reaction rate is increased with increasing temperature and a preferred temperature range to expedite the reaction without possibility of damage to the wool is 100–120° C. Conventional inert, volatile solvents such as chlorobenzene, toluene, or xylene may be added to the reaction system. The use of a solvent is especially indicated where the epoxide used is a solid and the proportion of dimethylformamide is not sufficient to dissolve the epoxide. The degree of modification of the wool is influenced by the proportion of epoxide taken up by the fiber, that is, the higher the uptake of epoxide the greater will be the modification of the wool. In general, the uptake of epoxide may be varied about from 1 to 30% by weight. In conducting the reaction, the epoxide is generally employed in excess over the amount desired to be taken up by the fiber. The time of reaction will vary depending on the proportion of dimethylformamide, temperature of reaction, reactivity of the epoxide selected and the degree of modification desired. In general, the reaction may take anywhere from a few minutes to several hours.

It is a feature of the invention that the reaction in question is carried out under essentially anhydrous conditions. The significance of this aspect of the invention will be evident from the following explanation:

In the prior art it is suggested that wool can be modified by reacting it with various epoxides in aqueous systems, that is, the epoxide in aqueous solution is applied to the wool or the vapors of the epoxide entrained in moist air are applied to the wool. Although such prior procedures are effective to obtain reaction of the epoxide with the wool, I have found that superior results are attained when wool is reacted with an epoxide in the presence of dimethylformamide under essentially anhydrous conditions. The superior results concern the properties of the product (the modified wool), particularly its hand and tensile strength. Thus, the modified wools prepared in accordance with the invention retain the soft feel and pliable texture of the original (untreated) wool. In contrast, modified wools prepared by reacting wool with epoxides under moist conditions exhibit a harsh feel and are stiff and boardy. Also, they have a lower wet strength than the products made under the conditions of the invention. To summarize—by conducting the reaction of wool with an epoxide in the presence of dimethylformamide under essentially anhydrous conditions, one is enabled not only to chemically modify the wool to increase its usefulness in particular areas but additionally, such a result is attained without detriment to the hand of the textile. The significance of moisture on the reaction is further demonstrated by the following experiments:

Swatches of wool flannel (each weighing 1.3 g.) were each treated by heating at 105 °C. for 60 minutes with 3 ml. of 1,4-butanediol diglycidyl ether and 3 ml. of dimethylformamide, dimethylformamide-water mixture, or water as indicated in the table below. Following the reaction, the samples were extracted with acetone and alcohol to remove unreacted reagents, then dried. The conditions applied and the uptakes of epoxide by the different samples are set forth below.

| Sample | Dimethyl-formamide, ml. | Water, ml. | Uptake of Epoxide by Wool, Percent |
|---|---|---|---|
| 1 | 3 | 0 | 18 |
| 2 | 2 | 1 | 14 |
| 3 | 1 | 2 | 16 |
| 4 | 0 | 3 | 17 |

The four samples were then examined to determine their surface characteristics of texture and flexibility. Also, strips of the fabric one inch wide were soaked in water and their wet breaking strength measured. The results are tabulated below.

| Sample | Ratio of dimethyl-formamide to water | Fabric texture | Flexibility | Wet strength, lbs. |
|---|---|---|---|---|
| 1 | 3:0 | Soft | Pliable | 5.6 |
| 2 | 2:1 | Medium harsh | Medium stiff | 4.3 |
| 3 | 1:2 | Very harsh | Very stiff | 2.8 |
| 4 | 0:3 | do | Extremely stiff | 1.4 |

After reaction of the wool with the epoxide, the chemically modified wool is preferably treated to remove excess epoxide, dimethylformamide, and solvent, if such is used. Thus, the wool may be treated as by wringing, passage through squeeze rolls, centrifugation, or the like to remove the excess materials. In place of such mechanical action, or following it, the product may be extracted with an inert, volatile solvent such as trichloroethylene, benzene, acetone, carbon tetrachloride, alcohol, etc. Successive extractions with different solvents may be used to ensure complete removal of all unreacted materials. The treated wool is then dried in the usual way.

By treating wool with epoxides as herein described, the wool is chemically modified because there is a chemical reaction between the epoxide and the protein molecules of the wool fibers. As a result the modified wool exhibits advantageous properties over normal wool. In particular, the modified wool is more resistant to oxidizing conditions. Such conditions may be encountered in textile mills during bleaching or other finishing processes and also in use by the action of light and air. The increased resistance to oxidizing conditions is illustrated by the lowered solubility of the modified wool in the peracetic acid-ammonia test described herein below.

Although the properties of the modified wool indicate beyond question that actual chemical combination between the wool and the epoxide has taken place, it is not known for certain how the wool and epoxide moieties are joined. It is believed, however, that the epoxide reacts with some of the sites on the wool molecule where there are reactive hydrogen atoms, e.g., amino, guanidino, and carboxyl groups. It may be, however, that other reactions occur and we do not intend to limit the invention to any theoretical basis. It is also to be noted that when the reaction is carried out with diepoxides (or polyepoxides), for example butanediol diglycidyl ether, combination with the wool may establish cross-links that further increase the resistance of the fibers to chemical attack.

It is to be noted that the reaction in accordance with the invention does not destroy the fibrous nature of the wool so that the products can still be used for producing woven or knitted textiles, garments, etc. The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The invention is of particular advantage in reacting wool with epoxides of higher molecular weight—that is, those with eight or more carbon atoms. Such epoxides are notorious for their inability to react with wool when using known procedures. However, by applying the process disclosed herein such epoxides can be caused to react readily with wool.

Although the invention is particularly adapted for reacting wool with epoxides containing eight or more carbon atoms, the reaction-promoting ability of dimethylformamide is not restricted to any particular epoxide or class of epoxides. Consequently, the invention may be applied in the reaction of wool with all types of organic epoxides. Thus the epoxides used in accordance with the invention are organic compounds having at least one epoxy group per molecule and may be saturated or unsaturated, aliphatic, aromatic, or heterocyclic and may be substituted with non-interfering substituents such as hydroxyl groups, ether radicals, vinyl groups, carboxyl groups, ester groups, halogen groups, etc. Illustrative examples of epoxides which may be employed in the application of the invention are set forth below:

Monoepoxides: Ethylene oxide, butylene oxide, dodecylene oxide, hexadecylene oxide,

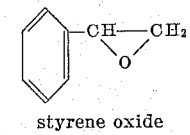
styrene oxide

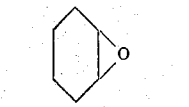
cyclohexene epoxide

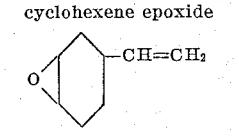
vinyl cyclohexene epoxide

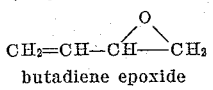
butadiene epoxide

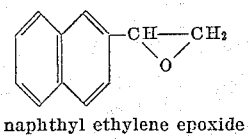
naphthyl ethylene epoxide

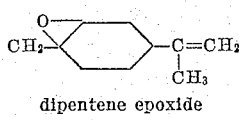
dipentene epoxide

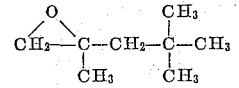
1,2-epoxy-2,4,4-trimethyl pentane (diisobutylene epoxide)

α-pinene epoxide, and the like.

Diepoxides: Butadiene dioxide (i.e., 1,2,3,4-diepoxybutane), isoprene diepoxide, limonene diepoxide,

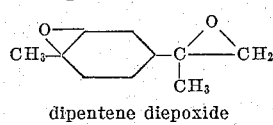
dipentene diepoxide

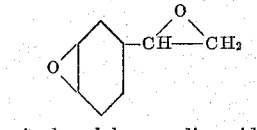
vinyl cyclohexene diepoxide

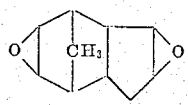
dicyclopentadiene diepoxide

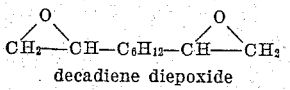
decadiene diepoxide

Halogenated epoxides: Epichlorhydrin, epibromhydrin, epiiodohydrin, 3-chloro-1,2-epoxybutane, 3-bromo-1,2-epoxyhexane, 3-chloro-1,2-epoxyoctane, 1,4-dichloro-2,3-epoxybutane, etc.

Other substituted epoxides: Glycidol, glycidyl methacrylate, diepoxy stearic acid, methyl 9,10-epoxystearate,

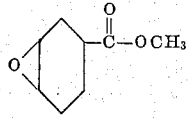
methyl ester of epoxy cyclohexene carboxylic acid

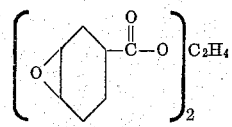
ethylene glycol ester of epoxy cyclohexene carboxylic acid

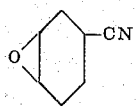
3,4-epoxy cyclohexyl cyanide

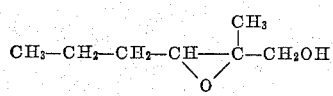
2-methyl-2,3-epoxyhexanol

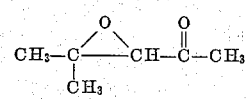
mesityl oxide epoxide and other epoxy derivatives such as

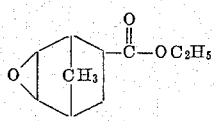

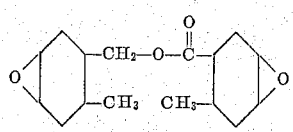

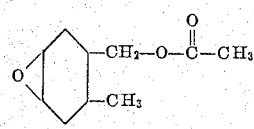

Epoxide ethers: Glycidyl ether of dicyclopentadienol epoxide, allyl glycidyl ether, phenyl glycidyl ether, butyl glycidyl ether, bis(epoxydicyclopentyl) ether of ethylene glycol, 1,10-dimethoxy-3,4,7,8-diepoxydecane, isopropyl glycidyl ether, etc. Coming into special consideration are the diglycidyl or polyglycidyl ethers of such polyols as glycerol, diglycerol, propylene glycol, ethylene glycol, diethylene glycol, butylene glycol, hexanetriol, sorbitol, mannitol, pentanetriol, pentaerythritol, dipentaerythritol, polyglycerol, dulcitol, inositol, carbohydrates, methyltrimethylol propane, 1,4-butanediol, 2,6-octanediol, tetrahydroxycyclohexane, 2-ethyl hexanetriol-1,2,6, glycerol methyl ether, glycerol allyl ether, polyvinyl alcohol, polyallyl alcohol, resorcinol, catechol, hydroquinone, 4,4'-dihydroxydiphenyl ether, methyl resorcinol, 2,2-bis (parahydroxyphenyl) propane, 2,2-bis (parahydroxyphenyl) butane, 4,4'-dihydroxybenzophenone, bis (parahydroxyphenyl) ethane, 1,5-dihydroxynaphthalene, 1,4-dihydroxycyclohexane, bis (2,2'-dihydroxydinaphthyl) methane, etc. Illustrative examples of polyepoxide polyethers are as follows:

1,4-bis (2,3-epoxypropoxy) benzene; 1,3-bis (2,3-epoxypropoxy) benzene; 4,4'-bis (2,3-epoxypropoxy) diphenyl ether; 1,8-bis (2,3-epoxypropoxy) octane; 1,4-bis (2,3-epoxypropoxy) cyclohexane; 4,4'-bis (2-hydroxy-2,4-epoxybutyl) diphenyl dimethylmethane; 1,3-bis (4,5-epoxypentoxy)-5-chlorobenzene; 1,4-bis (3,4-epoxybutoxy)-2-chlorohexane; diglycidyl thioether; diglycidyl ether; ethylene glycol diglycidyl ether; propylene glycol diglycidyl ether; diethylene glycol diglycidyl ether; resorcinol diglycidyl ether; 1,2,3,4-tetrakis (2-hydroxy-3,4-epoxybutoxy) butane; 2,2-bis (2,3-epoxypropoxyphenyl) propane; glycerol triglycidyl ether; mannitol tetraglycidyl ether; pentaerythritol tetraglycidyl ether; sorbitol tetraglycidyl ether; glycerol diglycidyl ether; etc.

For use in accordance with the invention, I prefer the polyepoxides which contain ether groups, that is, polyepoxide polyethers. More particularly, I prefer to use the polyepoxide polyethers of the class of glycidyl polyethers of polyhydric alcohols or glycidyl polyethers of polyhydric phenols. These compounds may be considered as being derived from a polyhydric alcohol or polyhydric phenol by etherification with at least two glycidyl groups—

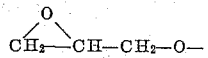

The invention is demonstrated by the following illustrative examples:

*Example I*

A 1.2-gram sample of dry wool flannel was treated with a mixture of 3 ml. of glycerol-1,3-diglycidyl ether and 3 ml. of dimethylformamide for 7 days at 35° C. The treated wool was extracted by washing in warm acetone followed by overnight extraction in a Soxhlet apparatus with ethanol. The uptake of epoxide, determined from the weight of dried modified fabric, was 16%.

*Example II*

A 1.2-gram sample of dry wool flannel was treated with a mixture of 2 ml. of 1,4-butanediol diglycidyl ether and 4 ml. of dimethylformide for 7 days at 35° C. The treated wool was extracted as described in Example I. The uptake of epoxide was 13%.

*Example III*

A series of runs was carried out wherein dry wool flannel was reacted with various epoxides in the presence of dimethylformamide. In these runs, the weight of dry wool was 1.2 grams and the temperature of reaction was 105° C. The epoxide used, the amount of reagents, the reaction time, and the uptake of epoxide are tabulated below.

| Epoxide | Vol or Wt. of Epoxide | Dimethyl-formamide, ml. | Reaction Time, min. | Uptake of Epoxide, Percent |
|---|---|---|---|---|
| Styrene oxide | 2 ml | 4 | 60 | 8 |
| Do | 4 ml | 2 | 60 | 11 |
| Phenyl glycidyl ether | 2 ml | 4 | 20 | 9 |
| Do | 4 ml | 2 | 30 | 10 |
| Diglycidyl ether of 2,2-bis(parahydroxyphenyl) propane. | 1 g | 10 | 90 | 9 |
| Do | 3 g | 10 | 90 | 15 |
| Glycerol-1,3-diglycidyl ether. | 3 ml | 3 | 120 | 30 |

Example IV

Experiments were carried out to determine the resistance of the modified wools to oxidizing conditions by measuring their solubility in peracetic acid-ammonia. In this test, about 0.4 g. of wool is treated at room temperature for 24 hours with 100 ml. of 2% peracetic acid followed by 100 ml. of 0.3% ammonium hydroxide. The loss in weight is determined after thorough washing with water. The results obtained are given below.

| Epoxide | Uptake of Epoxide by Wool, Percent | Peracetic Acid-Ammonia Solubility, Percent |
|---|---|---|
| None (untreated wool) | 0 | 83 |
| Styrene oxide | 11 | 51 |
| Diglycidyl ether of 2,2-bis(parahydroxyphenyl) propane | 15 | 29 |
| Glycerol-1,3-diglycidyl ether | 15 | 33 |
| Do | 22 | 16 |
| 1,4-butanediol diglycidyl ether | 13 | 27 |
| Do | 19 | 15 |

Having thus described the invention, what is claimed is:

1. A process for chemically modifying wool which comprises reacting wool under essentially anhydrous conditions, with an epoxide mixed with dimethylformamide.
2. The process of claim 1 wherein the epoxide is styrene oxide.
3. The process of claim 1 wherein the epoxide is a glycidyl ether.
4. The process of claim 1 wherein the epoxide is glycerol diglycidyl ether.
5. The process of claim 1 wherein the epoxide is phenyl glycidyl ether.
6. The process of claim 1 wherein the epoxide is butanediol diglycidyl ether.
7. The process of claim 1 wherein the epoxide is diglycidyl ether of 2,2-bis(parahydroxyphenyl) propane.

References Cited in the file of this patent

UNITED STATES PATENTS

| | | |
|---|---|---|
| 2,131,145 | Schlack | Sept. 27, 1938 |
| 2,730,427 | Suen | Jan. 10, 1958 |
| 2,836,185 | Hervey | May 27, 1958 |
| 2,881,090 | Reidl | Apr. 7, 1959 |
| 2,971,024 | Zaugg | Feb. 7, 1961 |
| 2,986,445 | Koenig | May 30, 1961 |
| 2,993,748 | Koenig | July 25, 1961 |

OTHER REFERENCES

Alexander: Wool, Its Chemistry and Physics, pp. 73–85, pub. 1954 by Reinhold Pub. Co., New York city.